(12) United States Patent
Yamaguchi et al.

(10) Patent No.: US 6,973,379 B2
(45) Date of Patent: Dec. 6, 2005

(54) CONTINUOUSLY VARIABLE TRANSMISSION CONTROL APPARATUS

(75) Inventors: Masaaki Yamaguchi, Tochigi-ken (JP); Keisuke Katsuta, Saitama-ken (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 10/960,515

(22) Filed: Oct. 8, 2004

(65) Prior Publication Data

US 2005/0080536 A1 Apr. 14, 2005

(30) Foreign Application Priority Data

Oct. 10, 2003 (JP) .............................. 2003-352265

(51) Int. Cl.[7] .............................................. F16H 9/00
(52) U.S. Cl. .............................. 701/51; 701/54; 477/45
(58) Field of Search .............................. 701/36, 51, 52, 701/53, 54, 55, 56, 84; 477/37, 44, 45, 46, 477/50, 159

(56) References Cited

U.S. PATENT DOCUMENTS

| | | | |
|---|---|---|---|
| 5,445,577 A | * | 8/1995 | Fujita et al. ................. 477/120 |
| 5,569,114 A | | 10/1996 | Matsuda et al. |
| 5,665,029 A | * | 9/1997 | Minowa et al. .............. 477/168 |
| 5,667,457 A | * | 9/1997 | Kuriyama et al. ........... 477/156 |
| 6,459,798 B1 | * | 10/2002 | Paritsky et al. .............. 381/172 |
| 6,767,309 B2 | * | 7/2004 | Fujimoto et al. ............. 477/44 |
| 6,859,709 B2 | * | 2/2005 | Joe et al. ....................... 701/51 |

FOREIGN PATENT DOCUMENTS

| | | |
|---|---|---|
| EP | 1 113 198 A2 | 7/2001 |
| JP | 6-288448 | 10/1994 |
| JP | 2001-182760 | 7/2001 |

* cited by examiner

*Primary Examiner*—Richard M. Camby
(74) *Attorney, Agent, or Firm*—Arent Fox PLLC

(57) ABSTRACT

A theoretical torque transmitted through a belt is calculated, and a first guaranteed torque is calculated by adding a marginal torque to the theoretical torque. In step S101, the theoretical torque is multiplied by a safety factor, calculating a second guaranteed torque. The second guaranteed torque is set to a value greater than a lower limit value. A smaller one of the first guaranteed torque and the second guaranteed torque is stored in a buffer, and a pressing force calculation reference torque is set through the buffer.

26 Claims, 8 Drawing Sheets

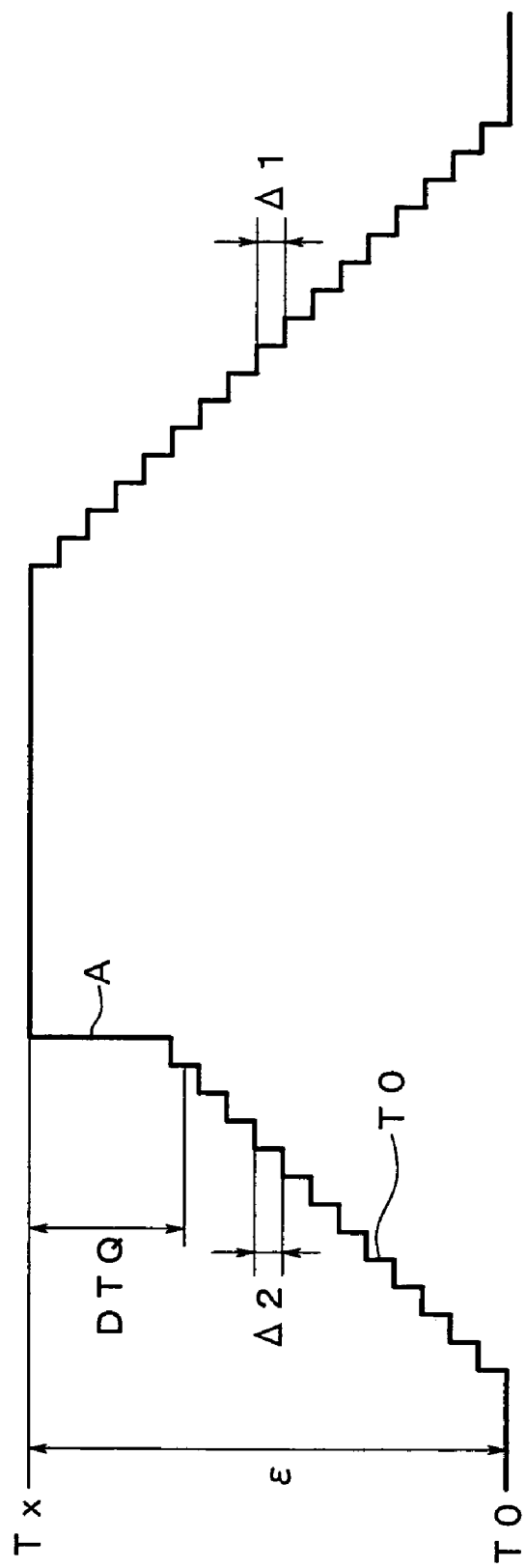

CONTINUOUSLY VARIABLE TRANSMISSION CONTROL APPARATUS

BACKGROUND OF THE INVENTION

1. Field of the Invention

The present invention relates to a continuously variable transmission control apparatus for controlling a continuously variable transmission which transmits the rotational speed of the output of the engine on a motor vehicle at a continuously variable transmission ratio to the wheel axle.

2. Description of the Related Art

There have been developed and put to practical use continuously variable transmissions for transmitting the rotational speed of the output of the engine on a motor vehicle at a continuously variable transmission ratio to the wheel axle. The continuously variable transmissions make it possible to achieve a smoothly changing transmission ratio and select an appropriate engine rotational speed depending on the driving condition of the motor vehicle for reduced fuel consumption.

One type of a continuously variable transmission is a belt-type continuously variable transmission comprising a belt trained around a drive pulley and a driven pulley. Each of the drive pulley and the driven pulley has a cylinder for setting a pulley width. When the cylinder is actuated, the diameter of a circle around which the belt is trained on each of the drive pulley and the driven pulley is changed to establish a transmission ratio.

The cylinder is required to set a pulley width and also to cause the pulley to press and grip the belt under appropriate forces to prevent the belt from slipping on the pulley. There has been proposed a technique for calculating a torque to be transmitted by a continuously variable transmission and actuate the cylinder to cause the pulley to press the belt under appropriate forces based on the calculated torque (see, for example, Japanese Laid-Open Patent Publication No. 6-288488). According to the proposed technique, the cylinder can be operated under a suitable pressure even if the torque transmitted by the continuously variable transmission is of a negative value.

When the hydraulic pressure supplied to the cylinder is too high, the power required to operate a pump for generating the hydraulic pressure is excessively large that it develops a power loss, increasing the fuel consumption by the motor vehicle.

SUMMARY OF THE INVENTION

It is an object of the present invention to provide a continuously variable transmission control apparatus for controlling a belt-type continuously variable transmission by operating cylinders under appropriate forces for setting pulley widths of drive an driven pulleys so as to reduce the power required to operate the cylinders.

According to the present invention, there is provided a continuously variable transmission control apparatus for controlling a continuously variable transmission having a drive pulley connected to an output shaft of an engine on a motor vehicle and having a drive cylinder for setting a pulley width, and a driven pulley drivable by the drive pulley through a belt to drive a wheel axle and having a driven cylinder for setting a pulley width, so that the continuously variable transmission transmits the rotational speed of the output shaft at a continuously variable transmission ratio to the wheel axle, the continuously variable transmission control apparatus comprising torque calculating means for calculating a theoretical torque to be transmitted through the belt, guaranteed torque calculating means for calculating a guaranteed torque which is different when the motor vehicle is in a normal operating state and a low load state, from the calculated theoretical torque, and working fluid pressure setting means for setting a working fluid pressure to be applied to the drive cylinder and the driven cylinder from the guaranteed torque.

By calculating the guaranteed torque which is different when the motor vehicle is in the normal operating state and the low load state, the cylinders of the drive and driven pulleys can be actuated under appropriate forces, and the power required to operate the cylinders can be reduced. The fuel consumption by the motor vehicle is reduced, and the service life of the belt that is trained around the drive pulley and the driven pulley is increased.

The guaranteed torque calculating means comprises first arithmetic means for calculating a first guaranteed torque by adding a first constant to the calculated theoretical torque, second arithmetic means for calculating a second guaranteed torque by multiplying a second constant by the calculated theoretical torque, and guaranteed torque selecting means for selecting a smaller one of the first guaranteed torque and the second guaranteed torque when the motor vehicle is in the low load state, and the working fluid pressure setting means sets the working fluid pressure according to a pressing force calculation reference torque selected by the guaranteed torque selecting means.

When the motor vehicle is in the low load state, a smaller one of the first guaranteed torque and the second guaranteed torque is selected to actuate the cylinders of the drive and driven pulleys under appropriate forces, and the power required to operate the cylinders can be reduced.

The low load state may comprise a stable running state determined according to predetermined conditions.

At least one of the predetermined conditions may comprise a condition based on a measured road resistance, a condition based on a measured gradient of a road on which the motor vehicle runs, a condition based on a slip ratio of a torque converter, a condition based on a throttle opening of the engine, a condition based on whether the continuously variable transmission is in a manual mode or not, or the like. The motor vehicle may be determined as being in the stable running state according to one of these conditions.

The continuously variable transmission control apparatus may further comprise a torque converter disposed between the engine and the continuously variable transmission, and the low load state may comprise a state in which the motor vehicle is stopped while a running clutch thereof is being engaged, the motor vehicle is being braked, and the torque converter is slipping.

When the pressing force calculation reference torque is changed by the guaranteed torque selecting means, the working fluid pressure applied to the drive cylinder and the driven cylinder may be gradually changed, for thereby preventing shocks from being produced in the cylinders.

The above and other objects, features, and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 8 is a timing chart showing the manner in which a pressing force calculation reference torque is changed by the torque change smoothing process.

DESCRIPTION OF THE PREFERRED EMBODIMENT

A continuously variable transmission control apparatus according to an embodiment of the present invention will be described below with reference to FIGS. 1 through 8.

Figure 1:
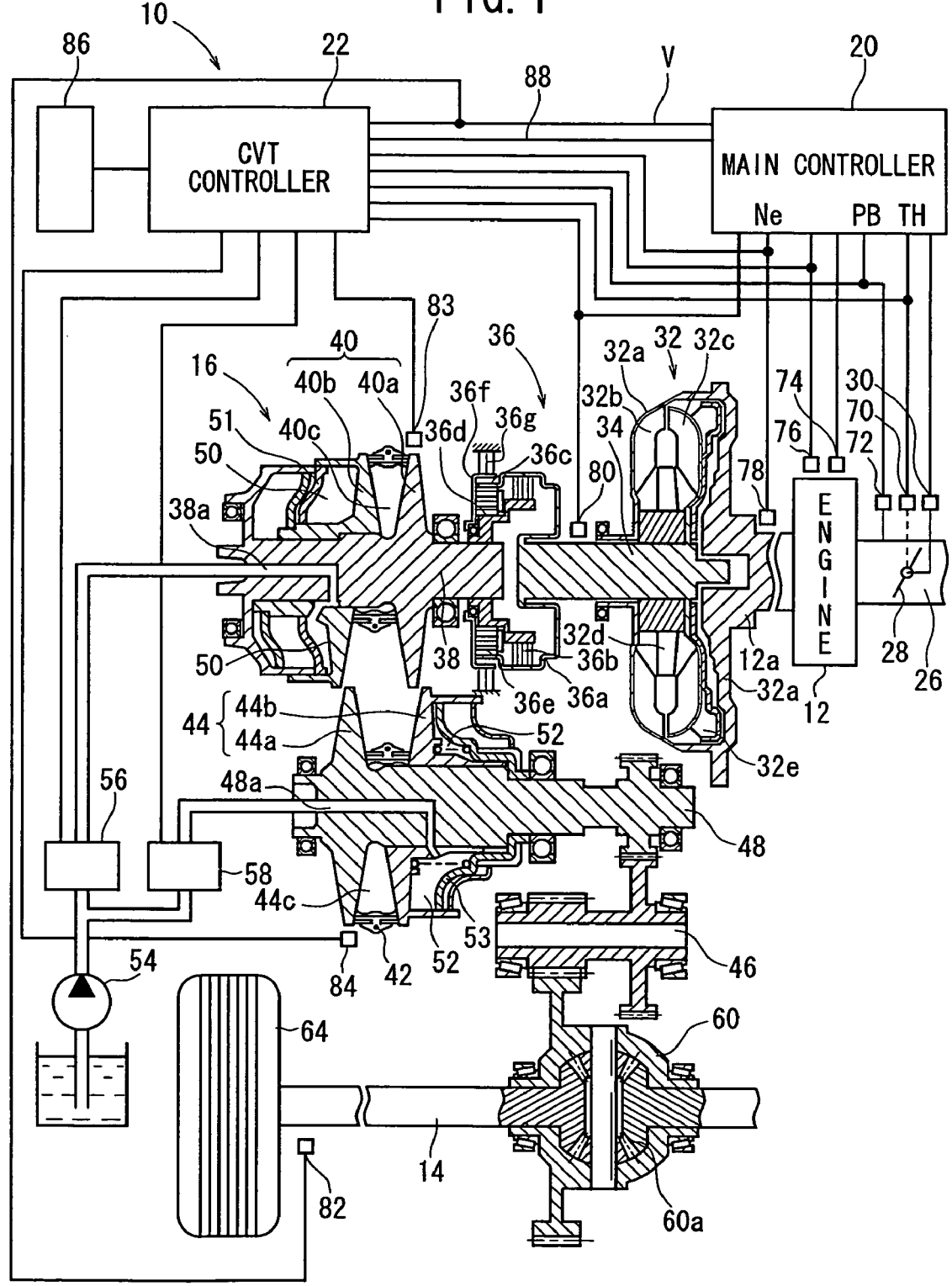
FIG. 1 is a cross-sectional view, partly in block form, of a drive mechanism of a motor vehicle which incorporates a continuously variable transmission (CVT) control apparatus according to an embodiment of the present invention.

As shown in FIG. 1, a continuously variable transmission control apparatus 10 according to the present embodiment controls a continuously variable transmission (CVT) 16 for transmitting the rotational speed of an output shaft 12a of an engine 12 on a motor vehicle at continuously variable transmission ratio to a wheel axle 14. The continuously variable transmission control apparatus 10 has a main controller 20 for controlling the engine 12 and operating the motor vehicle in an automatic cruise mode under a command from the driver of the motor vehicle, a CVT controller (working fluid pressure setting means) 22 for controlling the transmission ratio of the CVT 16, control valves 56, 58 for supplying a working oil to working oil chambers 50, 52 of the CVT 16 under the control of the CVT controller 22, and various sensors (described later) connected to the main controller 20 and the CVT controller 22.

The CVT 16 and a drive mechanism of the motor vehicle equipped with the CVT 16 will be described below with reference to FIG. 1.

A throttle valve 28 is disposed in an intake pipe 26 that is connected to the engine 12. The throttle valve 28 is interlinked with the accelerator pedal (not shown) positioned at the driver's seat and can be opened and closed under the control of the main controller 20 and a vacuum valve 30.

The engine 12 has an output shaft 12a connected to a torque converter 32. The torque converter 32 has a torque converter cover 32a joined to the output shaft 12a. When the torque converter cover 32a is rotated by the output shaft 12a, the torque converter cover 32a rotates a pump impeller 32b, and also rotates a turbine impeller 32c with respect to a torque converter shaft 34 through oil filled in the torque converter 32. The torque transmitted by the torque converter 32 is increased by a stator 32d. When a lockup clutch 32e is engaged, the torque converter cover 32a and the torque converter shaft 34 are connected to each other, directly transmitting the rotation of the output shaft 12a to the torque converter shaft 34.

The torque converter shaft 34 is connected to a forward/reverse switching mechanism 36 of the CVT 16. The forward/reverse switching mechanism 36 comprises a planetary gear mechanism having an input rotor 36a integrally connected to the torque converter shaft 34, a forward clutch 36b for interconnecting the input rotor 36a and an input shaft 38 of the CVT 16, and a ring gear 36c integrally formed with the input rotor 36a. The forward/reverse switching mechanism 36 also has a sun gear 36d mounted on an input shaft 38, a plurality of planetary gears 36e held in mesh with the sun gear 36d and the ring gear 36c, a carrier 36f on which the planetary gears 36e are rotatably supported, and a reverse clutch 36g for holding an outer circumferential portion of the carrier 36f in engagement with a housing.

The forward/reverse switching mechanism 36 operates as follows: When the forward clutch 36b is engaged, the input rotor 36a and the input shaft 38 engage each other for rotation in unison in one direction. When the forward clutch 36b is disengaged and the reverse clutch 36g is engaged, the carrier 36f and the housing are engaged with the reverse clutch 36g, and the carrier 36f is fixed in place, causing the planetary gears 36e to rotate the input shaft 38. The input shaft 38 is now rotated in a direction opposite to the direction in which the input rotor 36a rotates, thus reversing the motor vehicle.

The CVT 16 comprises the forward/reverse switching mechanism 36, a drive pulley 40 supported on the input shaft 38 for rotation therewith, a driven pulley 44 which is rotated by the drive pulley 40 through a metal belt 42 that is trained around the drive and driven pulleys 40, 44, and an output shaft 48 for transmitting the rotation of the driven pulley 44 to an intermediate shaft 46. The metal belt 42 comprises, for example, two straps and a plurality of pusher elements mounted on the straps.

The drive pulley 40 comprises a fixed pulley member 40a fixed to the input shaft 38 and a movable pulley member 40b slidable axially of the input shaft 38 toward and away from the fixed pulley member 40a under an oil pressure acting in a working oil chamber 50. The width, i.e., the pulley width, of a groove 40c defined in the drive pulley 40, i.e., defined between the fixed and movable pulley members 40a, 40b, can be changed depending on the position to which the movable pulley member 40b is slid. The movable pulley member 40b is slid by a cylinder (drive cylinder) 51 in which the working oil chamber 50 is provided.

Similarly, the driven pulley 44 comprises a fixed pulley member 44a fixed to the output shaft 48 and a movable pulley member 44b slidable axially of the output shaft 48 toward and away from the fixed pulley member 44a under an oil pressure acting in a working oil chamber 52. The width, i.e., the pulley width, of a groove 44c defined in the drive pulley 44, i.e., defined between the fixed and movable pulley members 44a, 44b, can be changed depending on the position to which the movable pulley member 44b is slid. The movable pulley member 44b is slid by a cylinder (driven cylinder) 53 in which the working oil chamber 52 is provided.

The working oil acting in the working oil chamber 50 is supplied from a pump 54 through the control valve 56 and an oil passage 38a extending in the input shaft 38 along its axis. The pump 54 is actuated by the engine 12 through a power transmitting means (not shown) such as a chain and sprocket mechanism. If the amount of work of the pump 54 is large, then the power required by the engine 12 to operate the pump 54 is also large, and hence the engine 12 consumes more fuel.

The control valves 56, 58 operate under the control of the CVT controller 22 for changing the oil pressure in the working oil chambers 50, 52. The movable pulley members 40b, 44b can thus be axially slid in ganged relation to each other to continuously change the widths of the grooves 40c, 44c. Therefore, the ratio of the diameters of circles around which the metal belt 42 is trained on the drive and driven pulleys 40, 44, i.e., the transmission ratio of the CVT 16, can continuously be changed.

Furthermore, the force by which the metal belt 42 is pressed by the fixed and movable pulley members 40a, 40b can be adjusted by changing the oil pressure in the working oil chamber 50. Similarly, the force by which the metal belt 42 is pressed by the fixed and movable pulley members 44a, 44b can be adjusted by changing the oil pressure in the working oil chamber 52. If the oil pressure in the working oil chambers 50, 52 is set to be high, then the metal belt 42 is more effectively prevented from slipping on the drive and driven pulleys 40, 44, but the amount of work of the pump 54 becomes larger.

The control valves 56, 58 are not limited to the type which is directly controlled by the CVT controller 22, but may be of the type which is pilot-operated by certain control devices.

In FIG. 1, the drive pulley 40 and the driven pulley 44 are shown as having respective upper halves, above the axes of the input shaft 38 and the output shaft 48, positioned for an OD (Over Drive) transmission ratio, and respective lower halves, beneath the axes of the input shaft 38 and the output shaft 48, positioned for a low transmission ratio.

The rotational speed of the input shaft 38 is transmitted to the output shaft 48 at a continuously variable transmission ratio established by the CVT 16. The rotational speed of the output shaft 48 is transmitted to a differential gear 60 at a speed reduction ratio established by the intermediate shaft 46.

The differential gear 60 drives the wheel axle 14 and drive wheels 64 (one shown in FIG. 1) to propel the motor vehicle, through a gear mechanism 60a which operates to absorb the difference between the rotational speeds of inner and outer wheels of the motor vehicle when the motor vehicle makes a turn.

To the main controller 20, there are connected a throttle opening sensor 70 for detecting a throttle opening TH which represents the opening of the throttle valve 28, a pressure sensor 72 for detecting an absolute pressure PB downstream of the throttle valve 28, a crankshaft angle sensor 74 for detecting a crankshaft angle of the engine 12, a coolant temperature sensor 76 for detecting an engine coolant temperature, a rotational speed sensor 78 for detecting a rotational speed Ne of the engine 12, a rotational speed sensor 80 for detecting a rotational speed of the torque converter shaft 34, and vehicle speed sensors 82 for detecting a vehicle speed V. There are four vehicle speed sensors 82 provided on left and right drive wheels 64 and left and right driven wheels.

To the CVT controller 22, there are connected a rotational speed sensor 83 for detecting a rotational speed of the input shaft 38 based on the teeth on the outer circumferential surface of the fixed pulley member 40a, a rotational speed sensor 84 for detecting a rotational speed of the output shaft 48 based on the teeth on the outer circumferential surface of the fixed pulley member 44a, and a position switch 86 for outputting a signal representative of a shift range (D, N, P, etc.) selected by the driver of the motor vehicle. The throttle opening sensor 70, the pressure sensor 72, the crankshaft angle sensor 74, the rotational speed sensors 78, 80, and the vehicle speed sensors 82 are also connected to the CVT controller 22.

The accelerator pedal and the brake pedal (not shown) of the motor vehicle are provided on an accelerator pedal switch (or sensor) and a brake pedal switch for detecting whether the corresponding pedals are depressed or not. The accelerator pedal switch and the brake pedal switch are connected to the CVT controller 22.

The main controller 20 and the CVT controller 22 are connected to each other by a communication line 88 for mutual data transmission.

Figure 2:
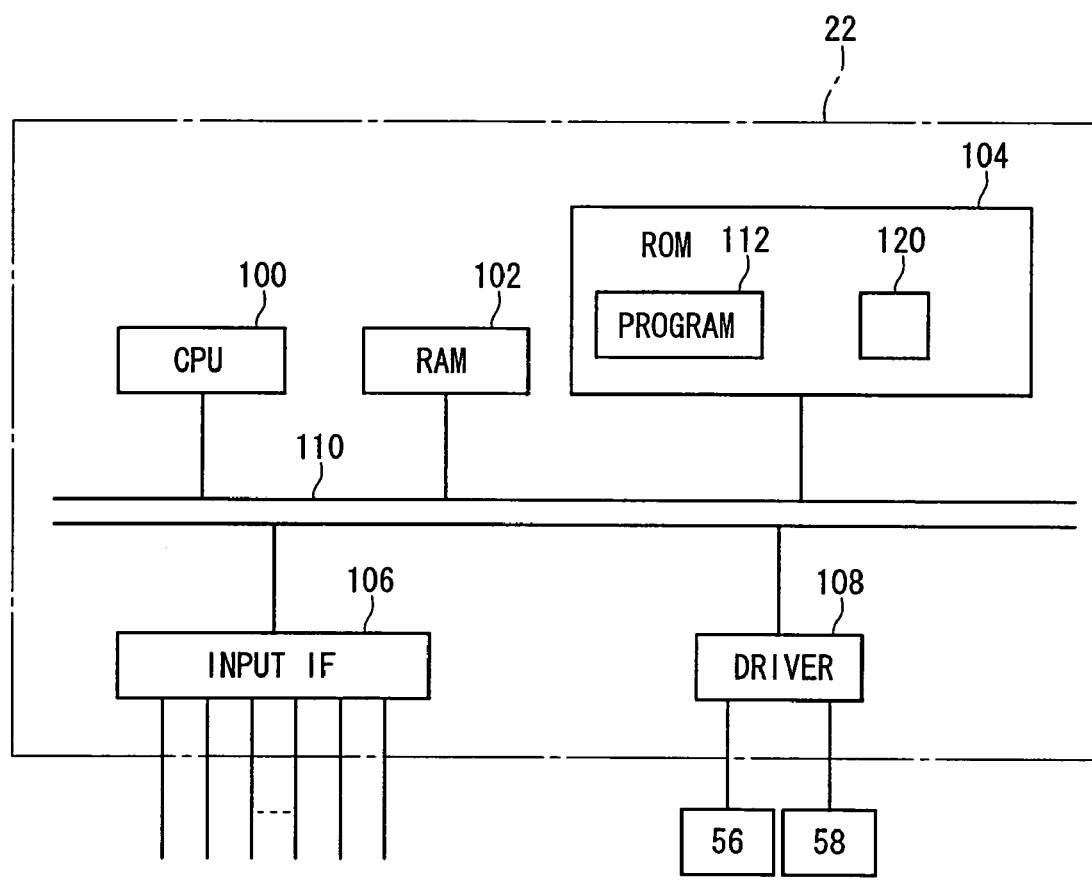
FIG. 2 is a block diagram of a CVT controller shown in FIG. 1.

As shown in FIG. 2, the CVT controller 22 has a CPU (Central Processing Unit) 100 as a main control unit, a RAM (Random Access Memory) 102 and a ROM (Read Only Memory) 104 as a storage unit, an input interface (IF) 106 for entering signals from the sensors, a driver 108 for actuating the control valves 56, 58, and a bus 110 interconnecting these components of the CVT controller 22.

The CPU 100 reads a program 112 stored in the ROM 104 and performs a process based on the contents of the program in cooperation with the RAM 102, the ROM 104, the input interface 106a, and the driver 108.

Operation of the continuously variable transmission control apparatus 10 thus constructed will be described below with reference to FIGS. 3 through 8.

Figure 3:
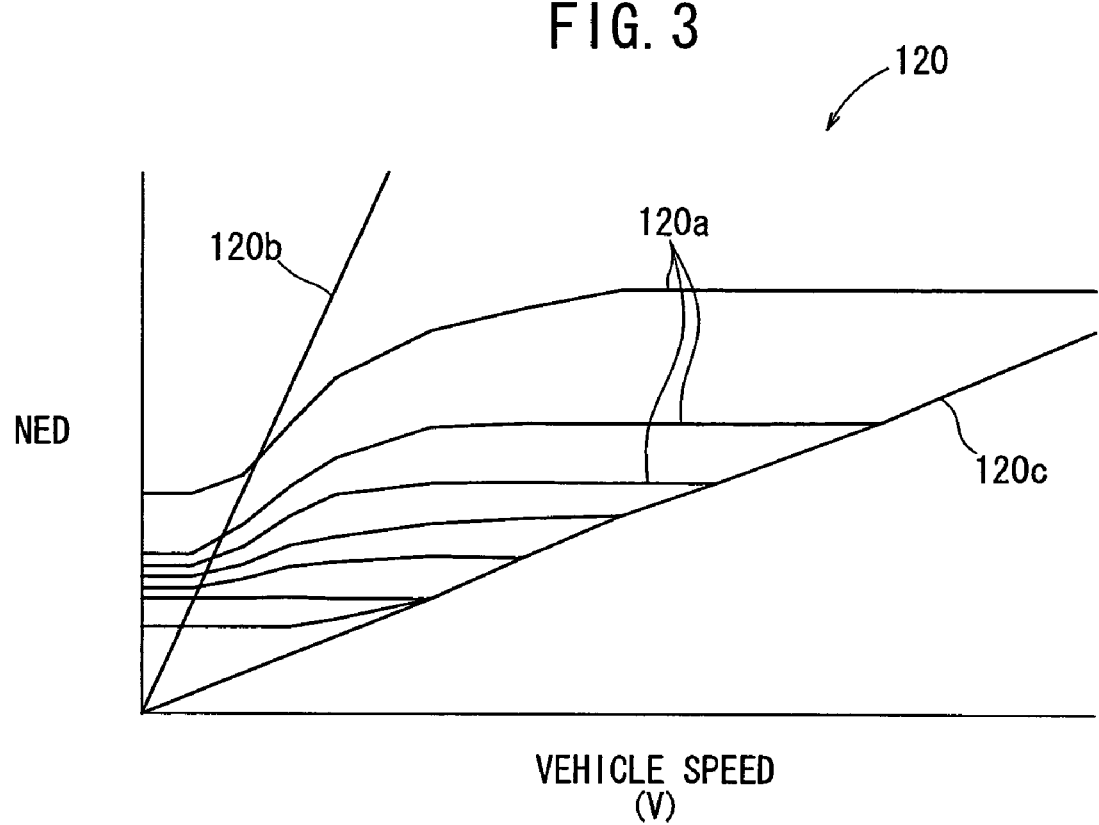
FIG. 3 is a graph showing a target engine rotational speed map.

The CVT controller 22 performs a basic transmission process under the control of the CPU 100 while referring to a target engine rotational speed map 120 (see FIG. 3) stored in the ROM 104. The target engine rotational speed map 120 has a plurality of recorded throttle opening curves 120a. One of the throttle opening curves 120a is selected depending on the detected throttle opening TH, or a throttle opening curve 120a is interpolated and selected depending on the detected throttle opening TH. In FIG. 3, a higher one of the throttle opening curves 120a corresponds to a larger throttle opening TH, and a lower one of the throttle opening curves 120a corresponds to a smaller throttle opening TH.

Figure 4:
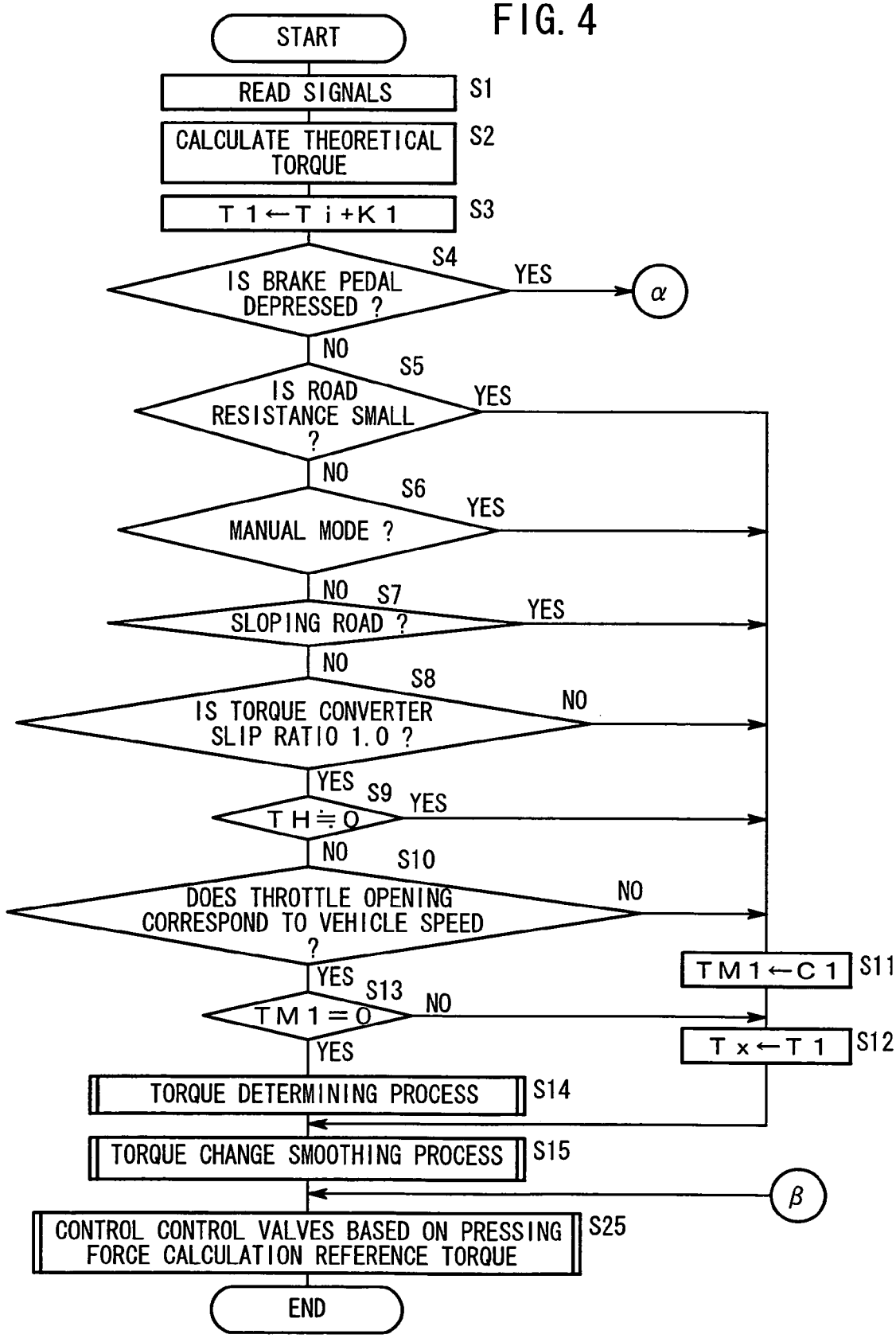
FIGS. 4 and 5 are a flowchart of a processing sequence of the CVT controller.
Figure 5:
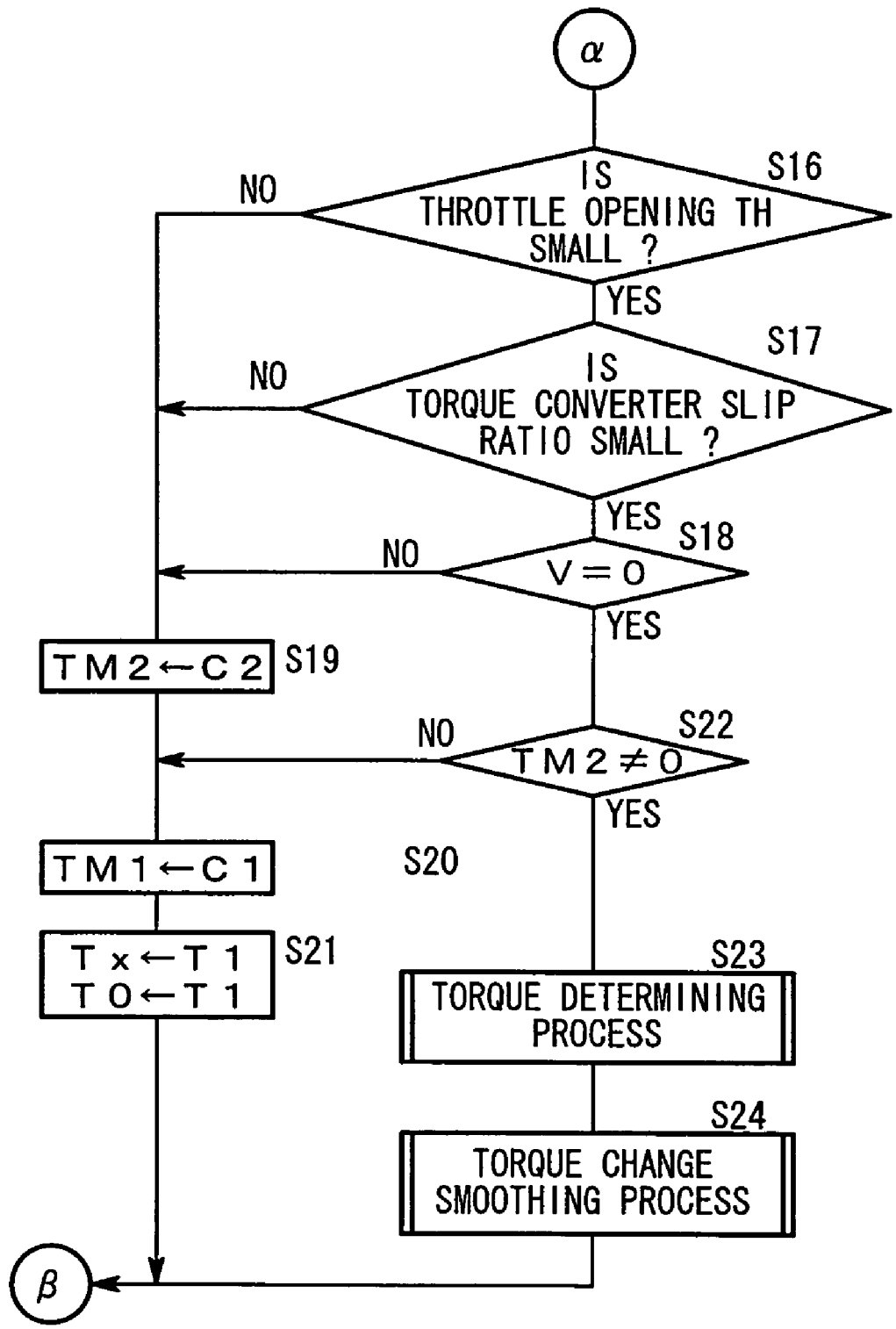

A process of determining a force to press the metal belt 42 with the cylinders 51, 53 in controlling the transmission ratio of the CVT 16 will be described below with reference to FIGS. 4 through 8. A processing sequence shown in FIGS. 4 and 5 is primarily carried out by the CPU 100, and is repeatedly performed in successive small time periods for real-time processing operation. It is assumed that the processing sequence is executed in the order of step numbers that are described unless otherwise noted.

In step S1 shown in FIG. 4, the CPU 100 reads signals representative of the throttle opening TH, the engine rotational speed Ne, the vehicle speed V, etc. from the throttle opening sensor 70, the rotational speed sensor 78, the vehicle speed sensor 82, etc.

In step S2, the CPU 100 calculates a theoretical torque Ti transmitted by the CVT 16. The CPU 100 may calculate the theoretical torque Ti based on an engine output torque, an inertial system inertia torque, an air conditioner drive friction, a pump drive friction, etc., as disclosed in Japanese Laid-Open Patent Publication No. 6-288488, for example.

In step S3 (first arithmetic means), the CPU 100 calculates a first guaranteed torque T1 by adding a predetermined marginal torque (first constant) K1 to the theoretical torque Ti.

Specifically, when the metal belt 42 is pressed by the cylinders 51, 53, in order to rotate the metal belt 42 and the movable pulley members 40b, 44b without slippage therebetween, it is necessary to press the cylinders 51, 53 with a force depending on the torque transmitted by the CVT 16. It is not appropriate to directly use the value of the theoretical torque Ti as the torque transmitted by the CVT 16 for the calculation of the force with which to press the cylinders 51, 53 (i.e., the pressure in the working oil chambers 50, 52), because the theoretical torque Ti is of a theoretical value, and practically, tends to suffer torque variations or output variations.

In step S3, the marginal torque K1 is added to the theoretical torque Ti to calculate the first guaranteed torque T1 which guarantees the theoretical torque Ti.

In step S4, the CPU 100 confirms whether the brake pedal switch is turned on or not. If the brake pedal switch is turned on, i.e., if the brake petal is depressed, then control jumps to step S16 (see FIG. 5). If the brake pedal switch is turned off, control goes to step S5.

In step S5, the CPU 100 determines a road resistance value. Specifically, the CPU 100 determines rotational speeds of the drive wheels 64 and the driven wheels (not shown) from output signals of the four vehicle speed sensors 82. If the difference between these rotational speeds is large, then it indicates that one of the drive wheels 64 is slipping, and the CPU 100 judges that the road resistance value is low. If the difference between these rotational speeds is small, then the CPU 100 judges that the road resistance value is high. If the road resistance value is low, then control goes to step S11. If the road resistance value is high, then control goes to step S6.

In step S6, the CPU 100 confirms whether the CVT 16 is in a manual mode or not. The manual mode is a mode in which the CVT 16 operates like a transmission with discrete shift ranges, and is suitable for sporty driving in which the driver can increase or reduce the engine rotational speed Ne as desired. The manual mode is selected when the drive operates a given switch.

If the CVT 16 is in the manual mode, then control goes to step S11. If the CVT 16 is in a normal mode, then control goes to step S7.

In step S7, the CPU 100 confirms whether the road on which the motor vehicle is running is a sloping road or not. Specifically, the CPU 100 calculates a gradient of the road. If the absolute value of the calculated gradient is equal to or smaller than a predetermined threshold, then control goes to step S8. If the absolute value of the calculated gradient exceeds the predetermined threshold, then control goes to step S11. The gradient of the road can be determined from a running resistance and a wheel drive force. Specifically, the gradient of the road may be determined by a process proposed in Japanese Laid-Open Patent Publication No. 2001-182760. Alternatively, the gradient of the road may be determined by an appropriate approximating equation or may directly be detected using a clinometer or the like.

In step S8, the CPU 100 confirms whether or not a slip ratio of the torque converter 32, i.e., a value produced by dividing the rotational speed of the torque converter shaft 34 by the engine rotational speed Ne, is 1.0 or a value close thereto. If the slip ratio is 1.0 or a value close thereto, i.e., if the torque converter 32 is almost free of any slippage, then control goes to step S9. If the slip ratio is of a greater value, then control goes to step S11.

In step S9, the CPU 100 confirms the value of the throttle opening TH. If the value of the throttle opening TH is approximately 0, i.e., if the accelerator pedal is released, then control goes to step S11. If the value of the throttle opening TH is not 0, i.e., if the accelerator pedal is depressed, then control goes to step S10.

In step S10, the CPU 100 confirms whether the throttle opening TH is of a value corresponding to the vehicle speed V or not. If the throttle opening TH is of a value corresponding to the vehicle speed V, it can be judged that the motor vehicle is running at a substantially constant speed, neither accelerated nor decelerated. If the throttle opening TH is of a value corresponding to the vehicle speed V, then control goes to step S13. Otherwise, control goes to step S11.

The processing in steps S4 through S10 makes it possible to determine whether the motor vehicle is running stably (or in the cruise mode) or not. Specifically, if control goes from the processing in steps S4 through S10 finally to step S13, the motor vehicle is judged as running stably. If control goes from the processing in steps S4 through S10 to step S11, then motor vehicle is judged as running unstably, e.g., as running uphill or being accelerated or decelerated.

Steps S4 through S10 may be judged by comparison with respective thresholds. Conditions other than steps S4 through S10 may be added to determine whether the motor vehicle is running stably or not.

In step S11, a timer counter TM1 for confirming the elapse of a period of time is set to a predetermined initial value C1. The timer counter TM1 is decremented by "1" periodically by a predetermined interrupt routine (not shown). The period of time that has elapsed from the time when the timer counter TM1 is set to the initial value C1 can be recognized by referring to the value of the timer counter TM1. The timer counter TM1 is reset to the initial value C1 each time the processing in step S11 is executed. During the processing in step S11, the timer counter TM1 is not decremented by the interrupt routine, and is not counted down.

After step S11, control goes to step S12 in which the first guaranteed torque T1 is stored in a buffer Tx. After step S12, control goes to step S15. The buffer Tx serves as a parameter for determining a pressing force calculation reference torque T0 based on the first guaranteed torque T1 and a second guaranteed torque T2 in step S25 to be described later.

In step S13, the CPU 100 confirms the value of the timer counter TM1 to determine whether it is 0 or not. The period of time that has elapsed from the time when the timer counter TM1 is finally set to the initial value C1 in step S11 can thus be recognized by confirming the value of the timer counter TM1. Stated otherwise, the CPU 100 can confirm that the stable running state of the motor vehicle has continued for a predetermined period of time. If the value of the timer counter TM1 is 0 and it is judged that the stable running state of the motor vehicle has continued for a predetermined period of time, then control goes to step S14. Otherwise, control goes to step S12.

In step S14 (guaranteed torque selecting means), the CPU 100 performs a torque determining process. The torque determining process is executed as a subroutine to determine a transmitted torque which needs to be transmitted at the time.

In step S15, the CPU 100 performs a torque change smoothing process. The torque change smoothing process is executed as a subroutine to smooth the value of a torque that can be transmitted by the CVT 16, thereby preventing the CVT 16 from suffering shocks.

The torque determining process in step S14 and the torque change smoothing process in step S15 will be described later.

In step S16 (if the brake pedal is depressed) shown in FIG. 5, the CPU 100 confirms the value of the throttle opening TH. If the throttle opening TH is smaller than a predetermined threshold, i.e., if the accelerator pedal is not practically depressed, control goes to step S17. If the throttle opening TH is larger than the predetermined threshold, then control goes to step S19.

In step S17, the CPU 100 determines whether the slip ratio of the torque converter 32 is smaller than a predetermined threshold or not. If the slip ratio of the torque converter 32 is smaller than the predetermined threshold, i.e., if the torque converter 32 is slipping greatly, then control goes to step S18. If the slip ratio of the torque converter 32 is larger than the predetermined threshold, then control goes to step S19.

In step S18, the CPU 100 confirms whether the motor vehicle is completely stopped or not. If the motor vehicle is completely stopped, i.e., if the vehicle speed V is 0, then control goes to step S22. If the vehicle speed V is not 0, then control goes to step S19.

According to the processing in steps S16 through S18, it is confirmed that while the forward clutch 36b (see FIG. 1) is engaging and the torque converter 32 is slipping, and the motor vehicle is completely stopped, i.e., the motor vehicle is in an in-gear idling state. Specifically, if control goes from the processing in steps S16 through S18 finally to step S22, the motor vehicle is judged as being in the in-gear idling state. If control goes from the processing in steps S16 through S18 to step S19, then the motor vehicle is judged as running or being in a neutral gear position.

Conditions other than steps S16 through S18 may be added to determine whether the motor vehicle is in the in-gear idling state or not.

In step S19, a timer counter TM2 for confirming the elapse of a period of time is set to a predetermined initial value C2. As with the timer counter TM1, the timer counter TM2 is decremented by "1" periodically by a predetermined interrupt routine (not shown). The period of time that has elapsed from the time when the timer counter TM2 is set to the initial value C2 can be recognized by referring to the value of the timer counter TM2.

After step S19, control goes to step S20 in which the timer counter TM1 is set to the initial value C1.

In step S21, the buffer Tx is set to the first guaranteed torque T1 and the pressing force calculation reference torque T0.

In step S22, the CPU 100 confirms the value of the timer counter TM2 to determine whether it is 0 or not. The period of time that has elapsed from the time when the timer counter TM2 is finally set to the initial value C2 in step S19 can thus be recognized by confirming the value of the timer counter TM2. Stated otherwise, the CPU 100 can confirm that the in-gear idling state of the motor vehicle has continued for a predetermined period of time. If the value of the timer counter TM2 is 0 and it is judged that the in-gear idling state of the motor vehicle has continued for a predetermined period of time, then control goes to step S23. Otherwise, control goes to step S20.

In step S23 (guaranteed torque selecting means), the CPU 100 performs the same torque determining process as in step S14. After step S23, the CPU 100 performs the same torque change smoothing process as in step S15 in step S24.

After step S15, S21 or S24, control goes to step S25 (working fluid pressure setting means) in which the CPU 100 determines pressure values in the working oil chambers 50, 52 for pressing the metal belt 42 based on the pressing force calculation reference torque T0, and controls the control valves 56, 58 to generate the pressure values.

The cylinders 51, 53 are now actuated to cause the movable pulley members 40b, 44b to press the metal belt 42 under appropriate forces.

The torque determining process that is executed in steps S14, S23 will be described below with reference to FIG. 6.

In step S101 (second arithmetic means), the CPU 100 multiplies the theoretical torque Ti calculated in step S2 by a predetermined safety factor (second constant) K2, thereby calculating a second guaranteed torque T2.

As with the first guaranteed torque T1 calculated in step S3, the second guaranteed torque T2 is used instead of the theoretical torque Ti in view of torque variations or output variations in order to calculate forces with which to press the cylinders 51, 53 (i.e., pressure values in the working oil chambers 50, 52). The first guaranteed torque T1 and the second guaranteed torque T2 are selected according to the judgment process to be described below.

In step S102, the CPU 100 confirms whether the second guaranteed torque T2 is smaller than a predetermined lower limit value Ta or not. If the second guaranteed torque T2 is smaller than the lower limit value Ta, then control goes to step S103. If the second guaranteed torque T2 is larger than the lower limit value Ta, then control goes to step S104.

In step S103, the second guaranteed torque T2 is set to the lower limit value Ta.

In step S104, the CPU 100 compares the first guaranteed torque T1 and the second guaranteed torque T2 with each other. If the first guaranteed torque T1 is larger than the second guaranteed torque T2, then control goes to step S105. If the first guaranteed torque T1 is smaller than the second guaranteed torque T2, then control goes to step S106.

In step S105, the buffer Tx is set to the first guaranteed torque T1. In step S106, the buffer Tx is set to the second guaranteed torque T2.

For example, if the marginal torque K1 and the safety factor K2 are K1=5, K2=1.5, respectively, then when the theoretical torque Ti is Ti=10, the first guaranteed torque T1 and the second guaranteed torque T2 are equal to each other, i.e., T1=T2=15.

When the theoretical torque Ti is in excess of 10, then T1>T2, and step S106 is executed. When the theoretical torque Ti is less than 10, then T1<T2, and step S105 is executed. Therefore, the buffer Tx is set to a smaller one of the first guaranteed torque T1 and the second guaranteed torque T2.

Figure 6:
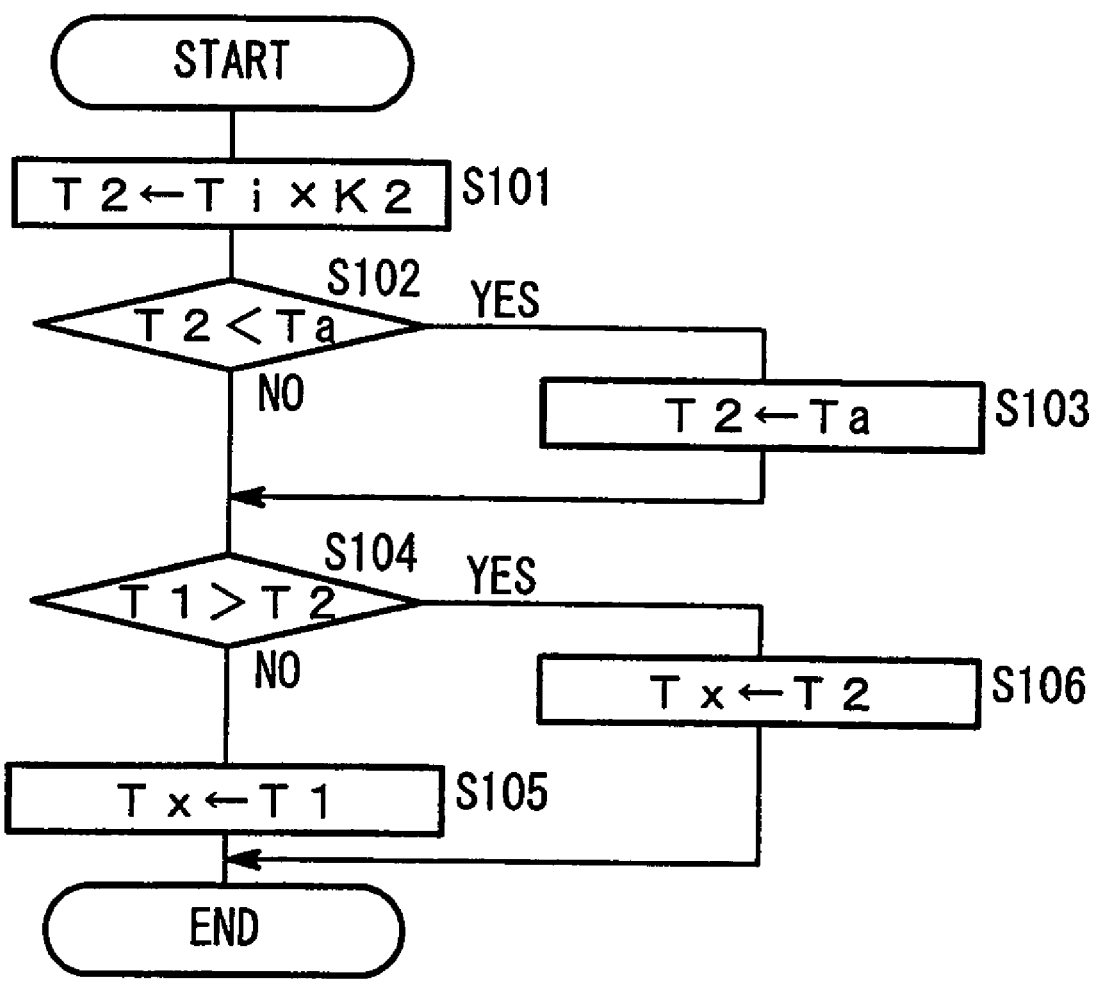
FIG. 6 is a flowchart of a processing sequence of a torque determining process.

After step S105 or step S106, the processing sequence shown in FIG. 6 is put to an end.

The torque determining process is performed in steps S14, S23. Depending on whether the torque determining process is invoked from step S14 (the stable running state) or from step S23 (the in-gear idling state), the lower limit value Ta may be set to a different value that is better suited to the stable running state or the in-gear idling state.

Figure 7:
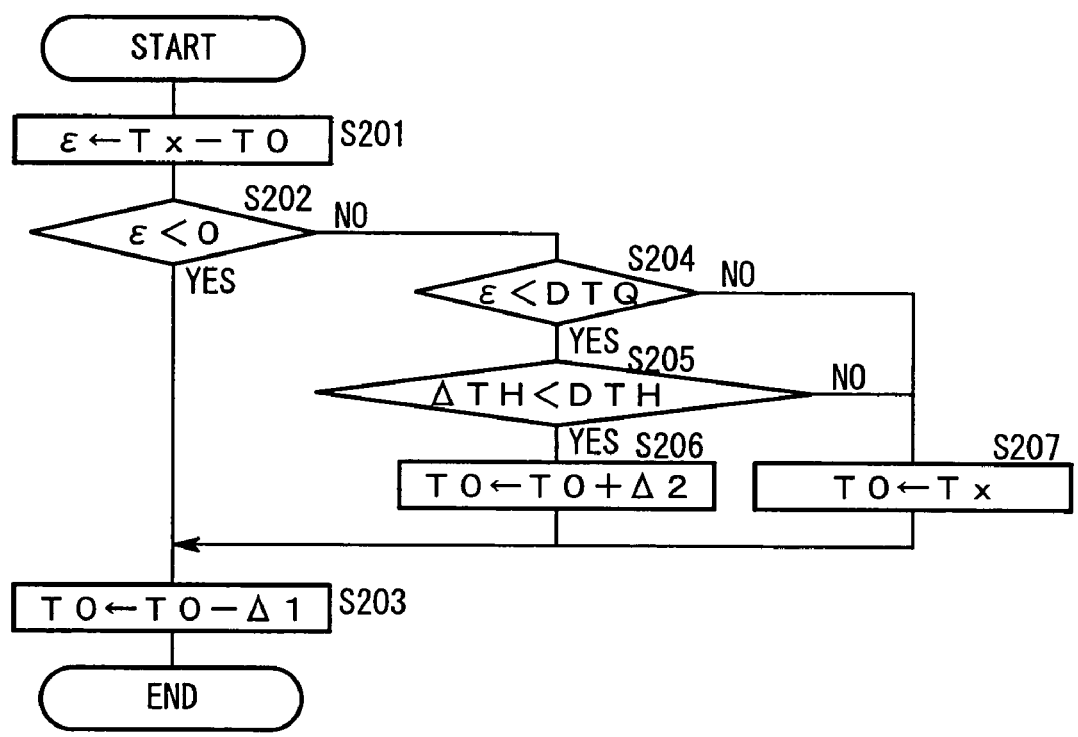
FIG. 7 is a flowchart of a processing sequence of a torque change smoothing process.

The torque change smoothing process that is executed in steps S15, S24 will be described below with reference to FIGS. 7 and 8. It is assumed that the pressing force calculation reference torque T0 keeps its value from the preceding cycle.

In step S201, the CPU 100 subtracts the pressing force calculation reference torque T0 from the buffer Tx, determining a deviation $\epsilon$.

In step S202, the CPU 100 confirms whether the deviation $\epsilon$ is smaller than 0 or not. If the deviation $\epsilon$ is smaller than 0, i.e., if the deviation $\epsilon$ is negative, then control goes to step S203. If the deviation $\epsilon$ is larger than 0, then control goes to step S204.

In step S203, the CPU 100 subtracts a small subtractive value $\Delta 1$ from the pressing force calculation reference torque T0 to update the pressing force calculation reference torque T0. As shown in FIG. 8, the pressing force calculation reference torque T0 is gradually lowered stepwise, preventing shocks from being produced in the cylinders 51, 53.

In step S204, the CPU 100 confirms whether the deviation $\epsilon$ is larger than an increase judgment threshold DTQ or not. If the deviation $\epsilon$ is smaller than the increase judgment threshold DTQ, then control goes to step S205. If the deviation $\epsilon$ is larger than the increase judgment threshold DTQ, then control goes to step S207.

The increase judgment threshold DTQ is set to a relatively small value which is greater than a small additive value Δ2. When control goes to step S207, the deviation ε is relatively small, and no shocks are produced in the cylinders 51, 53 even if the pressing force calculation reference torque T0 is directly set to the value of the buffer Tx.

In step S205, the CPU 100 confirms whether the absolute value of a change ΔTH in the throttle opening TH is smaller than a throttle opening threshold DTH or not. If the absolute value of the change ΔTH in the throttle opening TH is smaller than the throttle opening threshold DTH, then control goes to step S206. If the absolute value of the change ΔTH in the throttle opening TH is larger than the throttle opening threshold DTH, then control goes to step S207.

In step S206, the small additive value Δ2 is added to the pressing force calculation reference torque T0 to update the pressing force calculation reference torque T0. As shown in FIG. 8, the pressing force calculation reference torque T0 is gradually increased stepwise, preventing shocks from being produced in the cylinders 51, 53.

In step S207, the pressing force calculation reference torque T0 is set to the value of the buffer Tx. Therefore, the pressing force calculation reference torque T0 is immediately increased up to the value of the buffer Tx, as indicated by a step A in FIG. 8, for an increased response. When control goes from step S204 to step S207, the deviation ε is relatively small, and hence no shocks are produced in the cylinders 51, 53.

When control goes from step S205 to step S207, the absolute value of the change ΔTH in the throttle opening TH is relatively large, indicating that the driver of the motor vehicle clearly intends to accelerate or decelerate the motor vehicle. In this case, since the driver gives priority to the ability to accelerate or decelerate the motor vehicle, rather than suffering shocks, the cylinders 51, 53 may produce certain shocks, but the response of the CVT 16 is increased to better match the intention of the driver to accelerate or decelerate the motor vehicle.

With the continuously variable transmission control apparatus 10 according to the present invention, when the motor vehicle is in the stable running state or the in-gear idling state, i.e., in a low-load state, a smaller one of the first guaranteed torque T1 and the second guaranteed torque T2 is selected as the value of the torque transmitted by the CVT 16.

Specifically, on the assumption that the marginal torque K1 and the safety factor K2 are K1=5, K2=1.5, respectively, if the theoretical torque Ti is in excess of 10, then the first guaranteed torque T1 is selected, and if the theoretical torque Ti is less than 10, then the second guaranteed torque T2 is selected. Thereafter, the pressing force calculation reference torque T0 is gradually changed into conformity with a selected smaller one of the first guaranteed torque T1 and the second guaranteed torque T2 according to the torque change smoothing process in steps S15 or S24.

In a high load range of the motor vehicle while the motor vehicle is running, unstable factors such as torque variations or hydraulic pressure variations can be covered if the marginal torque K1 (specifically, a value of 0 or higher) is large enough. According to the present embodiment, the marginal torque K1 has such a setting.

In a low load (stable load) range of the motor vehicle, torque variations are small, and even if the marginal extent is smaller than a torque corresponding to the marginal torque K1, the slippage of the metal belt 42 can be compensated for. In this case, the safety factor should desirably change in linear relation to a change in the input torque, and it is preferable to multiply the theoretical torque Ti by the safety factor K2 (specifically, a value of 1.0 or higher). According to the present embodiment, the safety factor K2 has such a setting.

Thus, the pressing force calculation reference torque T0 is prevented from becoming an unnecessarily large value, with the result that the cylinders 51, 53 are allowed to produce appropriate forces to press the metal belt 42 under suitable forces. Specifically, when the motor vehicle is in the stable running state or the in-gear idling state and the theoretical torque Ti is less than 10, the pressing force calculation reference torque T0 is in conformity with the second guaranteed torque T2, preventing unduly large forces from being applied to the metal belt 42. The power required to operate the pump 54 is thus reduced, and the power consumed by the engine 12 is also lowered for reduced fuel consumption. Furthermore, the friction between the metal belt 42 and the drive and driven pulleys 40, 44 is reduced to increase the service life of the metal belt 42.

Inasmuch as the second guaranteed torque T2 is set to a value not smaller than the lower limit value Ta by the processing in steps S102, S203 (see FIG. 6), the second guaranteed torque T2 is prevented from becoming an extremely small value, allowing at least a minimum force to be generated to press the metal belt 42.

Even if the second guaranteed torque T2 is smaller than the first guaranteed torque T1, when the motor vehicle is not in the stable running state judged by steps S4 through S10 or in the in-gear idling state judged by steps S16 through S18, the torque determining process in step S14 or S23 is not executed, but the processing in step S12 or S21 is performed instead. In step S12 or S21, since the pressing force calculation reference torque T0 is directly set to the first guaranteed torque T1 through the buffer Tx, the metal belt 42 is reliably pressed against slippage on the drive and driven pulleys 40, 44.

Although a certain preferred embodiment of the present invention has been shown and described in detail, it should be understood that various changes and modifications may be made therein without departing from the scope of the appended claims.

What is claimed is:

1. A continuously variable transmission control apparatus for controlling a continuously variable transmission having a drive pulley connected to an output shaft of an engine on a motor vehicle and having a drive cylinder for setting a pulley width, and a driven pulley driven by said drive pulley through a belt to drive a wheel axle and having a driven cylinder for setting a pulley width, so that said continuously variable transmission transmits the rotational speed of said output shaft at a continuously variable transmission ratio to said wheel axle, said continuously variable transmission control apparatus comprising:

torque calculating means for calculating a theoretical torque to be transmitted through said belt;

guaranteed torque calculating means for calculating a guaranteed torque which is different when the motor vehicle is in a normal operating state and a low load state, from the calculated theoretical torque; and working fluid pressure setting means for setting a working fluid pressure to be applied to said drive cylinder and said driven cylinder from said guaranteed torque, wherein said guaranteed torque calculating means comprises:

first arithmetic means for calculating a first guaranteed torque by adding a first constant to said calculated theoretical torque;

second arithmetic means for calculating a second guaranteed torque by multiplying a second constant by said calculated theoretical torque; and guaranteed torque selecting means for selecting a smaller one of said first guaranteed torque and said second guaranteed torque when the motor vehicle is in said low load state;

wherein said working fluid pressure setting means sets said working fluid pressure according to a pressing force calculation reference torque selected by said guaranteed torque selecting means.

2. A continuously variable transmission control apparatus according to claim 1, wherein said low load state comprises a stable running state determined according to predetermined conditions.

3. A continuously variable transmission control apparatus according to claim 2, wherein at least one of said predetermined conditions comprises a condition based on a measured road resistance acting on said motor vehicle, and said motor vehicle is determined as being in said stable running state when said measured road resistance is greater than a threshold.

4. A continuously variable transmission control apparatus according to claim 2, wherein at least one of said predetermined conditions comprises a condition based on whether said continuously variable transmission is in a manual mode in which said continuously variable transmission operates like a transmission with discrete shift ranges, and said motor vehicle is determined as being in said stable running state when said continuously variable transmission is not in the manual mode.

5. A continuously variable transmission control apparatus according to claim 2, wherein at least one of said predetermined conditions comprises a condition based on a measured gradient of a road on which said motor vehicle runs, and said motor vehicle is determined as being in said stable running state when said measured gradient is smaller than a threshold.

6. A continuously variable transmission control apparatus according to claim 2, wherein at least one of said predetermined conditions comprises a condition based on a slip ratio of a torque converter disposed between said engine and said continuously variable transmission, and said motor vehicle is determined as being in said stable running state when said slip ratio is approximately 1.0.

7. A continuously variable transmission control apparatus according to claim 2, wherein at least one of said predetermined conditions comprises a condition based on a throttle opening of said engine, and said motor vehicle is determined as being in said stable running state when said throttle opening is greater than a threshold.

8. A continuously variable transmission control apparatus according to claim 2, wherein at least one of said predetermined conditions comprises a condition based on a throttle opening of said engine, and said motor vehicle is determined as being in said stable running state when said throttle opening is of a value corresponding to a vehicle speed.

9. A continuously variable transmission control apparatus according to claim 1, further comprising:

a torque converter disposed between said engine and said continuously variable transmission;

wherein said low load state comprises a state in which said motor vehicle is stopped while a running clutch thereof is being engaged, said motor vehicle is being braked, and said torque converter is slipping.

10. A continuously variable transmission control apparatus according to claim 1, wherein when said pressing force calculation reference torque is changed by said guaranteed torque selecting means, the working fluid pressure applied to said drive cylinder and said driven cylinder is gradually changed.

11. A continuously variable transmission control apparatus for controlling a continuously variable transmission having a drive pulley connected to an output shaft of an engine on a motor vehicle and having a drive cylinder for setting a pulley width, and a driven pulley driven by said drive pulley through a belt to drive a wheel axle and having a driven cylinder for setting a pulley width, so that said continuously variable transmission transmits the rotational speed of said output shaft at a continuously variable transmission ratio to said wheel axle, said continuously variable transmission control apparatus comprising:

torque calculating means for calculating a theoretical torque to be transmitted through said belt;

guaranteed torque calculating means for calculating a guaranteed torque which is different when the motor vehicle is in a normal operating state and a low load state, from the calculated theoretical torque;

working fluid pressure setting means for setting a working fluid pressure to be applied to said drive cylinder and said driven cylinder from said guaranteed torque; and a torque converter disposed between said engine and said continuously variable transmission;

wherein said low load state comprises a state in which said motor vehicle is stopped while a running clutch thereof is being engaged, said motor vehicle is being braked, and said torque converter is slipping.

12. A continuously variable transmission control apparatus according to claim 11, wherein said low load state comprises a stable running state determined according to predetermined conditions.

13. A continuously variable transmission control apparatus according to claim 12, wherein at least one of said predetermined conditions comprises a condition based on a measured road resistance acting on said motor vehicle, and said motor vehicle is determined as being in said stable running state when said measured road resistance is greater than a threshold.

14. A continuously variable transmission control apparatus according to claim 12, wherein at least one of said predetermined conditions comprises a condition based on whether said continuously variable transmission is in a manual mode in which said continuously variable transmission operates like a transmission with discrete shift ranges, and said motor vehicle is determined as being in said stable running state when said continuously variable transmission is not in the manual mode.

15. A continuously variable transmission control apparatus according to claim 12, wherein at least one of said predetermined conditions comprises a condition based on a measured gradient of a road on which said motor vehicle runs, and said motor vehicle is determined as being in said stable running state when said measured gradient is smaller than a threshold.

16. A continuously variable transmission control apparatus according to claim 12, wherein at least one of said predetermined conditions comprises a condition based on a slip ratio of a torque converter disposed between said engine and said continuously variable transmission, and said motor vehicle is determined as being in said stable running state when said slip ratio is approximately 1.0.

17. A continuously variable transmission control apparatus according to claim 12, wherein at least one of said predetermined conditions comprises a condition based on a throttle opening of said engine, and said motor vehicle is determined as being in said stable running state when said throttle opening is greater than a threshold.

18. A continuously variable transmission control apparatus according to claim 12, wherein at least one of said predetermined conditions comprises a condition based on a throttle opening of said engine, and said motor vehicle is determined as being in said stable running state when said throttle opening is of a value corresponding to a vehicle speed.

19. A continuously variable transmission control apparatus according to claim 11, wherein said guaranteed torque calculating means comprises:
- first arithmetic means for calculating a first guaranteed torque by adding a first constant to said calculated theoretical torque;
- second arithmetic means for calculating a second guaranteed torque by multiplying a second constant by said calculated theoretical torque; and
- guaranteed torque selecting means for selecting a smaller one of said first guaranteed torque and said second guaranteed torque when the motor vehicle is in said low load state;
- wherein said workng fluid pressure setting means sets said working fluid pressure according to a pressing force calculation reference torque selected by said guaranteed torque selecting means; and
- wherein when said pressing force calculation reference torque is changed by said guaranteed torque selecting means, the working fluid pressure applied to said drive cylinder and said driven cylinder is gradually changed.

20. A continuously variable transmission control apparatus for controlling a continuously variable transmission having a drive pulley connected to an output shaft of an engine on a motor vehicle and having a drive cylinder for setting a pulley width, and a driven pulley driven by said drive pulley through a belt to drive a wheel axle and having a driven cylinder for setting a pulley width, so that said continuously variable transmission transmits the rotational speed of said output shaft at a continuously variable transmission ratio to said wheel axle, said continuously variable transmission control apparatus comprising:
- torque calculating means for calculating a theoretical torque to be transmitted through said belt;
- guaranteed torque calculating means for calculating a guaranteed torque which is different when the motor vehicle is in a normal operating state and a low load state, from the calculated theoretical torque; and
- working fluid pressure setting means for setting a working fluid pressure to be applied to said drive cylinder and said driven cylinder from said guaranteed torque,
- wherein said guaranteed torque calculating means comprises:
  - first arithmetic means for calculating a first guaranteed torque by adding a first constant to said calculated theoretical torque;
  - second arithmetic means for calculating a second guaranteed torque by multiplying a second constant by said calculated theoretical torque; and
  - guaranteed torque selecting means for selecting a smaller one of said first guaranteed torque and said second guaranteed torque when the motor vehicle is in said low load state;
- wherein said working fluid pressure setting means sets said working fluid pressure according to a pressing force calculation reference torque selected by said guaranteed torque selecting means;
- wherein when said pressing force calculation reference torque is changed by said guaranteed torque selecting means, the working fluid pressure applied to said drive cylinder and said driven cylinder is gradually changed; and
- wherein said low load state comprises a stable running state determined according to predetermined conditions.

21. A continuously variable transmission control apparatus according to claim 20, wherein at least one of said predetermined conditions comprises a condition based on a measured road resistance acting on said motor vehicle, and said motor vehicle is determined as being in said stable running state when said measured road resistance is greater than a threshold.

22. A continuously variable transmission control apparatus according to claim 20, wherein at least one of said predetermined conditions comprises a condition based on whether said continuously variable transmission is in a manual mode in which said continuously variable transmission operates like a transmission with discrete shift ranges, and said motor vehicle is determined as being in said stable running state when said continuously variable transmission is not in the manual mode.

23. A continuously variable transmission control apparatus according to claim 20, wherein at least one of said predetermined conditions comprises a condition based on a measured gradient of a road on which said motor vehicle runs, and said motor vehicle is determined as being in said stable running state when said measured gradient is smaller than a threshold.

24. A continuously variable transmission control apparatus according to claim 20, wherein at least one of said predetermined conditions comprises a condition based on a slip ratio of a torque converter disposed between said engine and said continuously variable transmission, and said motor vehicle is determined as being in said stable running state when said slip ratio is approximately 1.0.

25. A continuously variable transmission control apparatus according to claim 20, wherein at least one of said predetermined conditions comprises a condition based on a throttle opening of said engine, and said motor vehicle is determined as being in said stable running state when said throttle opening is greater than a threshold.

26. A continuously variable transmission control apparatus according to claim 20, wherein at least one of said predetermined conditions comprises a condition based on a throttle opening of said engine, and said motor vehicle is determined as being in said stable running state when said throttle opening is of a value corresponding to a vehicle speed.

* * * * *